United States Patent [19]
Furuichi et al.

[11] Patent Number: 5,721,378
[45] Date of Patent: Feb. 24, 1998

[54] SERVO ACCELERATION SENSOR AND A METHOD FOR COMPUTING AN ACCELERATION OF THE VEHICLE ALONG A SLOPE

[75] Inventors: Kenji Furuichi; Ryota Ikeda, both of Tokyo; Moritaka Goto, Chiba; Takayuki Imai, Tokyo, all of Japan

[73] Assignee: Fujikura Ltd., Tokyo, Japan

[21] Appl. No.: 541,885

[22] Filed: Oct. 10, 1995

[30] Foreign Application Priority Data

Oct. 11, 1994 [JP] Japan .................................. 6-245696

[51] Int. Cl.$^6$ ...................................... G01P 15/13
[52] U.S. Cl. ........................ 73/514.19; 73/514.23; 73/514.16
[58] Field of Search ...................... 73/514.36, 514.19, 73/514.21, 514.23, 514.26, 514.39, 514.16

[56] References Cited

U.S. PATENT DOCUMENTS

| | | | |
|---|---|---|---|
| 4,598,586 | 7/1986 | Danielson | 73/514.23 |
| 4,649,748 | 3/1987 | Fukano et al. | 73/514.19 |
| 4,856,333 | 8/1989 | Ito | 73/514.19 |
| 4,869,108 | 9/1989 | Washisu | 73/514.19 |
| 4,987,780 | 1/1991 | Abbink et al. | 73/514.19 |
| 5,055,759 | 10/1991 | Miyahara | 73/514.19 |
| 5,058,960 | 10/1991 | Eccleston et al. | 73/514.36 |

FOREIGN PATENT DOCUMENTS

| | | |
|---|---|---|
| 5926286 | 7/1984 | Japan . |
| 63274872 | 11/1988 | Japan . |
| 4363669 | 12/1992 | Japan . |
| 51920 | 1/1993 | Japan . |
| 62244 | 1/1995 | Japan . |

*Primary Examiner*—Hezron E. Williams
*Assistant Examiner*—Helen C. Kwok
*Attorney, Agent, or Firm*—John P. White

[57] ABSTRACT

A servo acceleration sensor comprises a pendulum assembly composed of a pendulum made up of a torque coil provided on one side of a metal plate, a free end section from which the pendulum is suspended, a base end section, and a pair of plate springs connecting the free end section and the base end section, a permanent magnet placed away from the metal plate, a pendulum assembly support frame that supports the pendulum assembly with the base end section being secured, a displacement sensor that senses the displacement of the pendulum and outputs it in the form of an electric signal, and a sensing circuit that supplies power to the torque coil on the basis of the electric signal and thereby generates magnetic force to return the pendulum to the original position and also senses acceleration, wherein the free end section and the base end section are made of synthetic resin and the free end section, the base end section, the plate springs, and the metal plate are integrated into an entity.

24 Claims, 13 Drawing Sheets

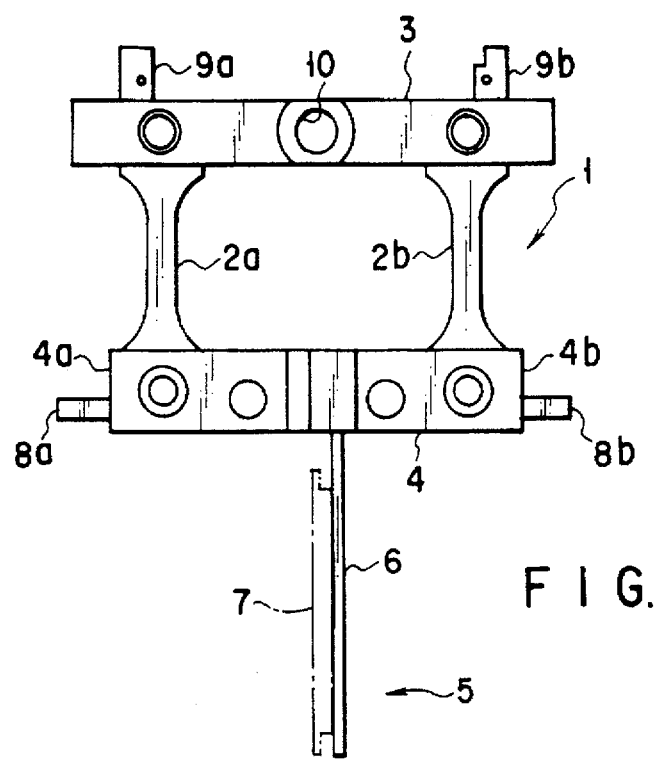
FIG. 3
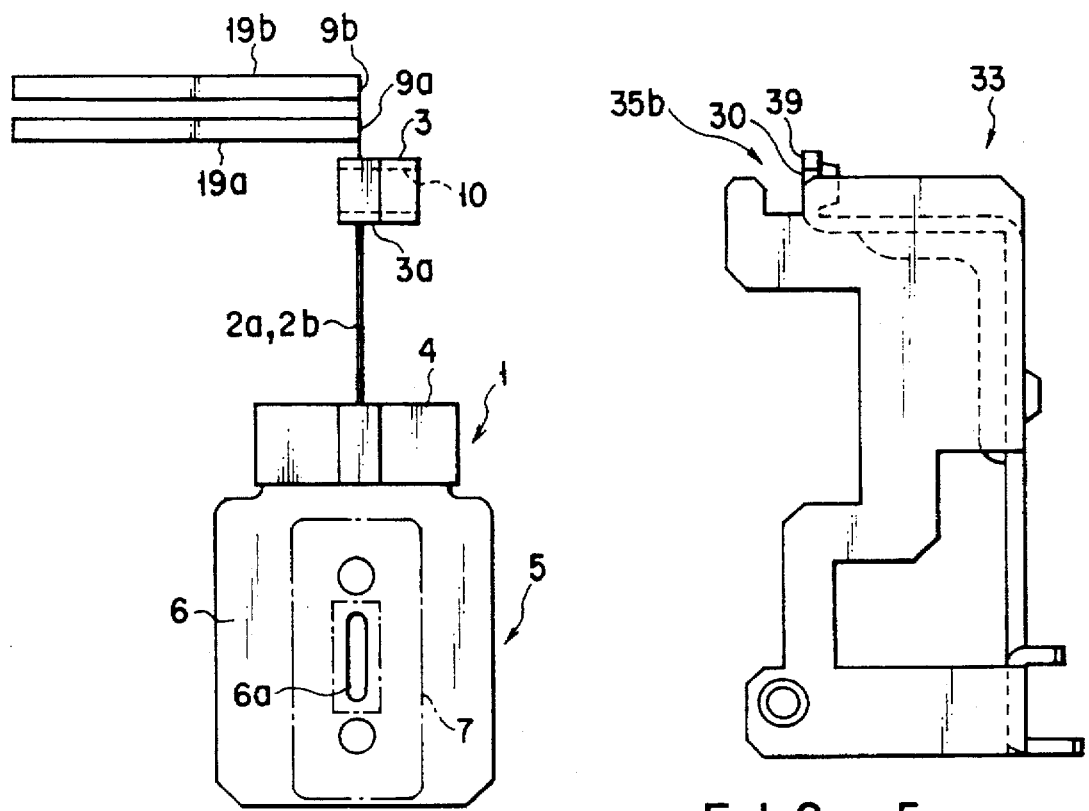
FIG. 4
FIG. 5

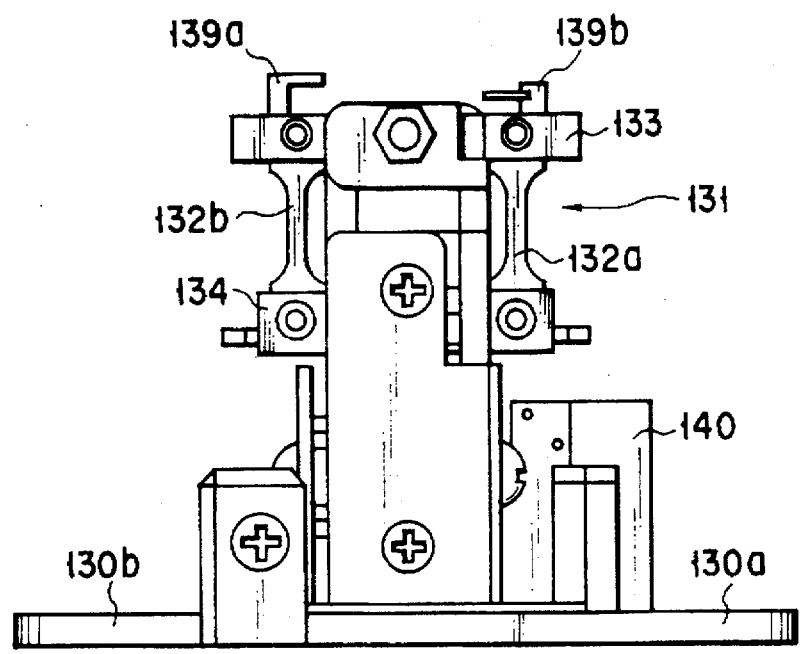
F I G. 15
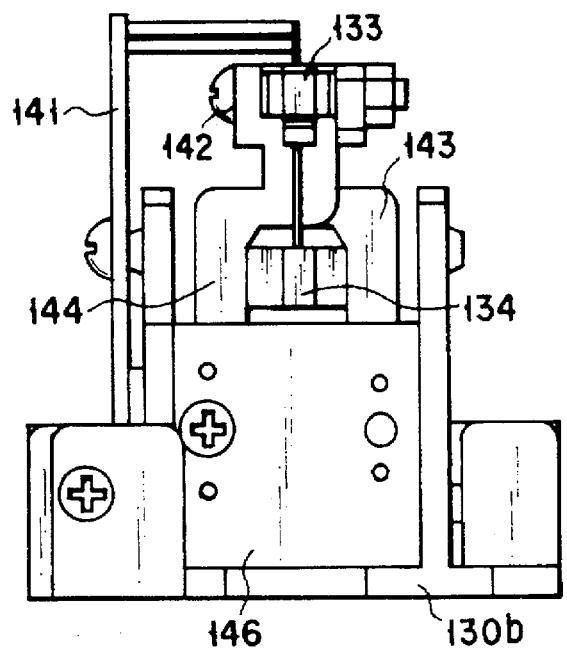
F I G. 16

SERVO ACCELERATION SENSOR AND A METHOD FOR COMPUTING AN ACCELERATION OF THE VEHICLE ALONG A SLOPE

BACKGROUND OF THE INVENTION

1. Field of the Invention

This invention relates to a servo acceleration sensor used in a car accelerometer or the like.

2. Description of the Related Art

Various acceleration sensors that sense the acceleration acting on a moving body such as a car have been proposed. For example, some of them are such servo acceleration sensors as disclosed in Jpn. Pat. Appln. KOKAI Publication No. 4-363669 and Jpn. UM Appln. KOKAI Publication No. 6-2244.

FIG. 1 is an exploded view of an acceleration sensor disclosed in Jpn. Pat. Appln. KOKAI 4-363669. As shown in FIG. 1, on the inner bottom of a U-shaped base 120 made of resin, an optical sensor 129 composed of a first optical sensor 129a and a second optical sensor 129b bisected by a vertical center line CL3 is provided. On both sides of the base 120 in the direction of the depth, plate yokes 121a and 121b made of a magnetic substance are provided. A pendulum housing space S2 is formed in such a manner that the base 120 and the yokes 121a, 121b enclose the space S2. On the inside sidewall of one yoke 121a, a pair of permanent magnets 128a and 128b that forms a magnetic circuit is provided, whereas in the other yoke 121b, a light source hole is made, in which a light source 199 such as an LED is provided.

In the pendulum housing space S2 formed by the base 120 and the yokes 121a and 121b, a pendulum 125 constructed as described below is provided. The pendulum 125 comprises an aluminium plate 126 in which a lower slit 126a is made, a torque coil 127a of a suitable number of turns wound around a coil bobbin 127 provided on one side of the aluminium plate 126, and a connecting plate 124 that extends in the direction perpendicular to the surface of the aluminium plate above the aluminium plate 126 and coil bobbin 127. The pendulum 125 is supported by a pair of plate springs 122a and 122b so that it may hang from a support frame 123. One end of the support frame 123 is attached to the upper part of the yoke 121a.

When acceleration acts on the acceleration sensor thus constructed, the pendulum 125 will swing in the direction of the acceleration. The swing causes the pendulum 125 to move a specific distance, displacing the light projected on the central portion of the optical sensor 129 via the slit 126a from the light source 199. The optical sensor 129 outputs an electric signal corresponding to the displacement of the illuminated position, that is, the displacement of the pendulum 125. The electric signal is amplified and the current is supplied to the torque coil 127a wound around the coil bobbin 127. Because this enables current to flow so as to cross a magnetic loop formed by the permanent magnets 128a and 128b, magnetic force acts on the torque coil 127a carrying current, thereby restoring the pendulum 125 to the original position, that is, the position where the pendulum was before the acceleration acted. At the same time, a voltage generated across a resistor connected in series to the torque coil 127a enables the magnitude of the acceleration to be sensed.

FIG. 2 is a schematic front view of a pendulum assembly in the acceleration sensor disclosed in Jpn. UM Appln. KOKAI Publication No. 6-2244, with the pendulum being cross-sectioned. In the pendulum assembly 81 of FIG. 2, the upper end portions of a pair of plate springs 82a and 82b are secured to a hold-down plate 83 with bolts 71a and 71b and bolts 72a and 72b, respectively. The hold-down plate 83 is provided on a support frame 89 for the pendulum assembly. The lower end portions of the plate springs 82a and 82b are secured to the plate-spring connecting sections 87a and 87b of a coil bobbin 87 with bolts 73a and 73b. On one side of the coil bobbin 87, an aluminium plate 86 is provided. A torque coil 80 is wound around the coil bobbin 87.

In the pendulum assembly 81 thus constructed, the support frame 89 for the pendulum assembly and the coil bobbin 87 including the coil bobbin connecting sections 87a and 87b are made of materials that have the same thermal expansion coefficient. This overcomes the disadvantage that the plate springs are twisted due to the difference in thermal expansion coefficient between the pendulum assembly support frame and the coil bobbin and prevents errors from occurring in sensing the displacement of the pendulum.

With the aforementioned conventional acceleration sensors, to sense acceleration with a high accuracy, the pendulum assembly must be provided so that the magnetic circuit made up of the yokes 121a and 121b and the permanent magnets 128a 128b and the pendulum 125 may be in a specific positional relation in the pendulum housing space S2 enclosed by the base 120 and the yokes 121a and 121b shown in FIG. 1. The individual components must be assembled so that when there is no acceleration acting on, the slit 126a in the aluminium plate of the pendulum 125 may be on the straight line connecting the light source 199 and the center line CL 3 of the optical sensor 129.

When assembling the acceleration sensor disclosed in Jpn. Pat. Appln. KOKAI Publication No. 4-363669, it is necessary to assemble many components in a manner that assembles the yokes 121a and 121b to the base 120, attaches the pendulum 125 to the support frame 123, or secures the support frame 123 to the yoke 121a as shown in FIG. 1. Therefore, in the assembly processes for acceleration sensors, the individual component parts must be assembled accurately, making the assembly work complicated. Furthermore, it is difficult to carry out all of the assembly steps accurately. Even if errors in each assembly step are small, the errors can accumulate and consequently the accuracy of the acceleration sensor itself may deteriorate.

Furthermore, with the pendulum assembly in the acceleration sensor disclosed in Jpn. UM Appln. KOKAI Publication No. 6-2244 shown in FIG. 2, although a twist in the plate springs due to the difference in thermal expansion coefficient can be prevented from occurring, many component parts are required and the number of assembly processes is large, making it impossible to reduce manufacturing cost.

In a navigation system that senses the present position of a vehicle and displays the vehicle's position on a map on the TV screen, there are two methods of sensing the present position of a vehicle: a GPS method that makes use of electromagnetic waves from GPS satellites and a self-contained navigation method that totalizes the moving distances of a vehicle from the starting point and estimates the present position on the map. In the self-contained navigation method, the moving distance of a vehicle is generally calculated by making use of car-speed pulses generated according to the revolutions of a wheel.

In a navigation system, a map on the TV screen is what is viewed from right above, but actually the roads appearing on the screen include not only level roads but also sloping roads. Such sloping roads are displayed in the same manner as level roads. The distance on the screen is such that the actual inclination is disregarded, although the actual distance of a sloping road is longer than the distance on the screen.

Therefore, in a case where a vehicle is running on a sloping road, when the moving distance obtained from car-speed pulses as described above is used directly in computing the present position of the vehicle, this causes the problem that the vehicle's position on the TV screen differs from the actual position of the vehicle.

To overcome the problem, for example, in Jpn. Pat. Appln. KOKAI Publication No. 5-1920, an acceleration sensor and a tilt angle sensor are used to compute the horizontal acceleration of a vehicle from the outputs of both sensors and determine the horizontal moving distance by double integral of the horizontal acceleration. The example has also disclosed that an acceleration sensor capable of sensing only the horizontal acceleration of a vehicle because of mechanical difficulties may be used.

with such a disclosure, an acceleration sensor capable of sensing only the horizontal acceleration has not been available yet. Tilt-angle sensors are available in those using a gyroscope and those optically sensing a tilt angle. A gyroscope cannot senses a tilt angle unless a vehicle is moving. For instance, even when a vehicle is at a standstill on a slope, if the tilt angle is $\theta$ and the gravitation is g, the acceleration sensor will be influenced by the gravitation and generate an output of g sin $\theta$. The gyroscope cannot sense the tilt angle $\theta$ and will provide double integral of g sin $\theta$, causing an error of (g sin $\theta$)$t^2$/2.

Furthermore, the optical sensing of a tilt angle $\theta$ results in a higher cost because of mechanical complexity, so that it is difficult to apply optical sensing to vehicles for which cost is considered important.

As described above, the gyroscope used as a tilt-angle sensor has the problem that it cannot sense a tilt angle when a vehicle is at a standstill on a slope, whereas the method of optically sensing a tilt angle of $\theta$ leads to higher cost because of mechanical complexity, making it difficult to apply this method to vehicles for which cost is regarded as important.

SUMMARY OF THE INVENTION

An object of the present invention is to provide a servo acceleration sensor which can be assembled easily with a high accuracy and enables manufacturing cost reduction by decreasing the number of component parts used.

Another object of the present invention is to provide a tilt-angle computing device which uses an acceleration sensor capable of sensing a tilt angle accurately with a relatively simple structure even when a moving body is at a standstill.

The foregoing objects are accomplished by providing a servo acceleration sensor comprising: a pendulum assembly composed of a pendulum made up of a torque coil provided on one side of a metal plate, a free end section from which the pendulum is suspended, a base end section, and a pair of plate springs connecting the free end section and the base end section; a permanent magnet placed away from the metal plate; a pendulum assembly support frame that supports the pendulum assembly with the base end section being secured; a displacement sensor that senses the displacement of the pendulum and outputs it in the form of an electric signal; and a sensing circuit that supplies power to the torque coil on the basis of the electric signal and thereby generates magnetic force to return the pendulum to the original position and also senses acceleration, wherein the free end section and the base end section are made of synthetic resin and the free end section, the base end section, the plate springs, and the metal plate are integrated into an entity.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3 is a front view of a pendulum assembly in a servo acceleration sensor according to a first embodiment of the present invention;

FIG. 4 is a side view of the pendulum assembly;

FIG. 5 is a side view of a support frame for the pendulum assembly in the servo acceleration sensor according to the first embodiment of the invention;

FIG. 15 is a rear elevation of the servo acceleration sensor;

FIG. 16 is a right side view of the servo acceleration sensor;

DETAILED DESCRIPTION OF THE PREFERRED EMBODIMENTS

Figure 1:
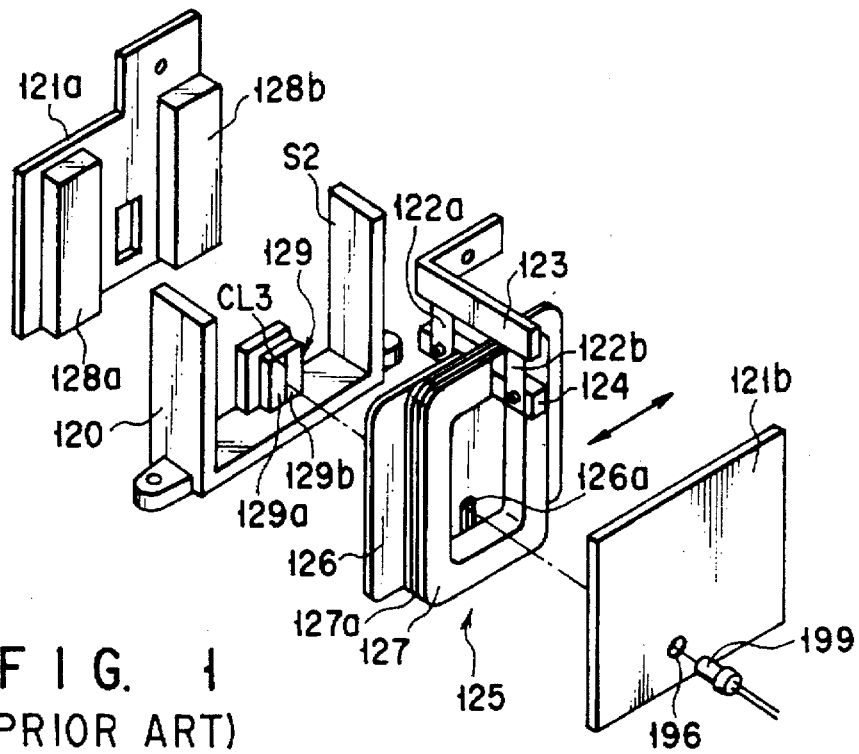
FIG. 1 is an exploded view of a conventional servo acceleration sensor.
Figure 2:
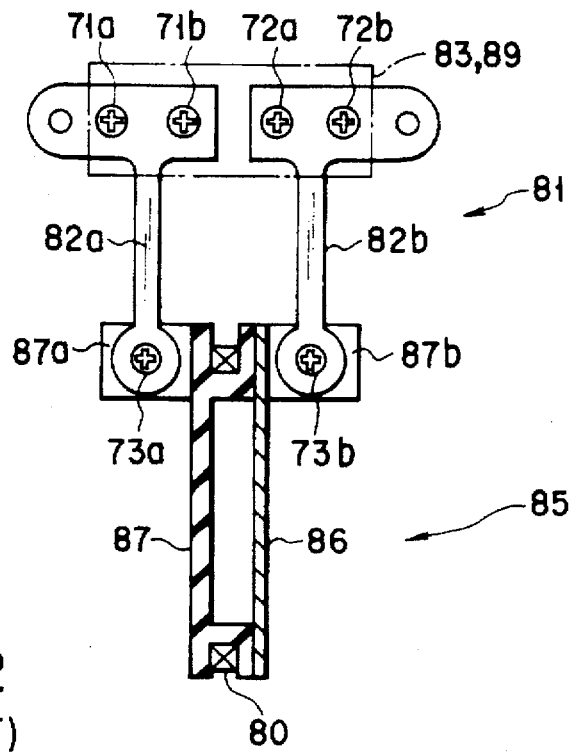
FIG. 2 is a schematic front view, partly in cross section, of a pendulum assembly in a conventional servo acceleration sensor.

Hereinafter, referring to the accompanying drawings, a first embodiment of the present invention will be explained.

A servo acceleration sensor according to the first embodiment will be explained with reference to FIGS. 3 to 9. In the servo acceleration sensor, a pendulum assembly constructed by integrating a free end section and base end section made of synthetic resin, a pair of plate springs, and a metal plate composing a pendulum into an entity, is supported by an independent support frame for a pendulum assembly.

FIG. 3 is a front view of the pendulum assembly in the servo acceleration sensor according to the present embodiment. FIG. 4 is a side view of the pendulum assembly. FIG. 5 is a side view of the support frame for the pendulum assembly in the servo acceleration sensor according to the embodiment. FIGS. 6, 7, 8, and 9 are a front view, side view, and top view of the servo acceleration sensor according to the embodiment and a top view in the direction of the arrow A in FIG. 7, respectively. FIGS. 6 to 9 are views with a cover 49 on a base 34 being assumed to be transparent.

As shown in FIG. 4, the pendulum assembly 1 comprises, a metal plate (an aluminium plate) 6 composing a pendulum 5, a free end section 4 from the central portion of which the metal plate 6 is suspended, a base end section 3 fixed to a support free, and a pair of plate springs 2a and 2b connecting the free end section 4 and the base end section 3.

Connection terminals 9a and 9b extended from the plate springs 2a and 2b project from both end portions of the top of the base end section 3. From the connection terminals 9a and 9b, connecting wires 19a and 19b extend backward and are connected to a printed-circuit board 42 connected to the back of a support frame for the pendulum assembly. Furthermore, direct terminals 8a and 8b extended respectively from the plate springs 2a and 2b project from both end portions 4a and 4b of the free end section 4.

Figure 7:
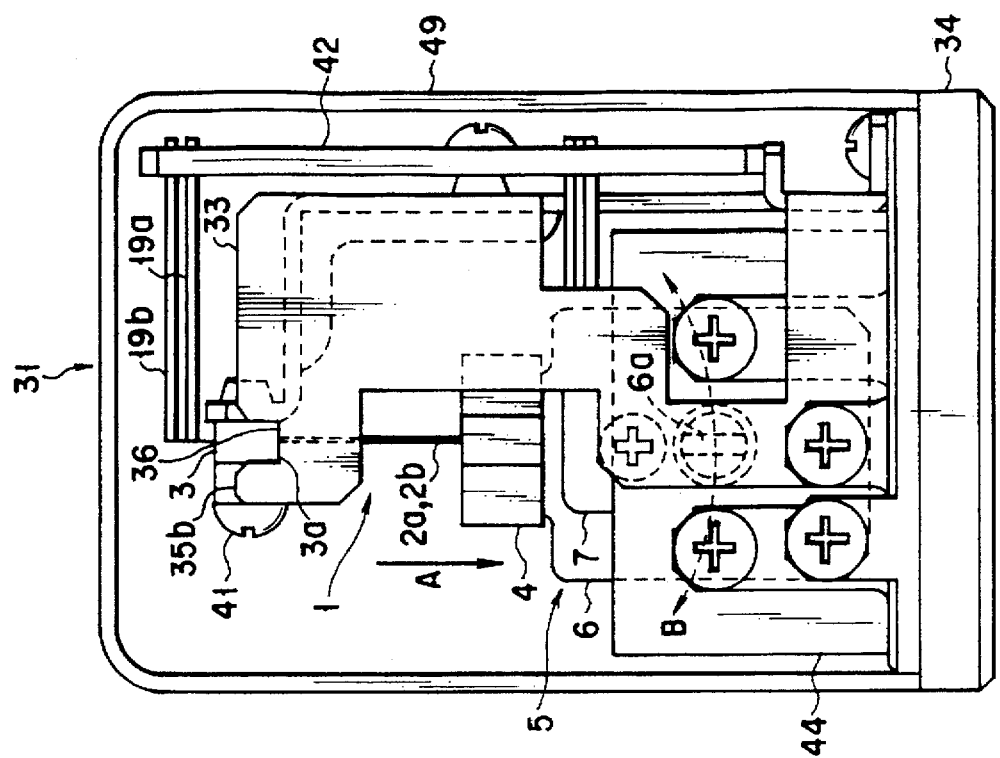
FIG. 7 is a side view of the servo acceleration sensor.
Figure 6:
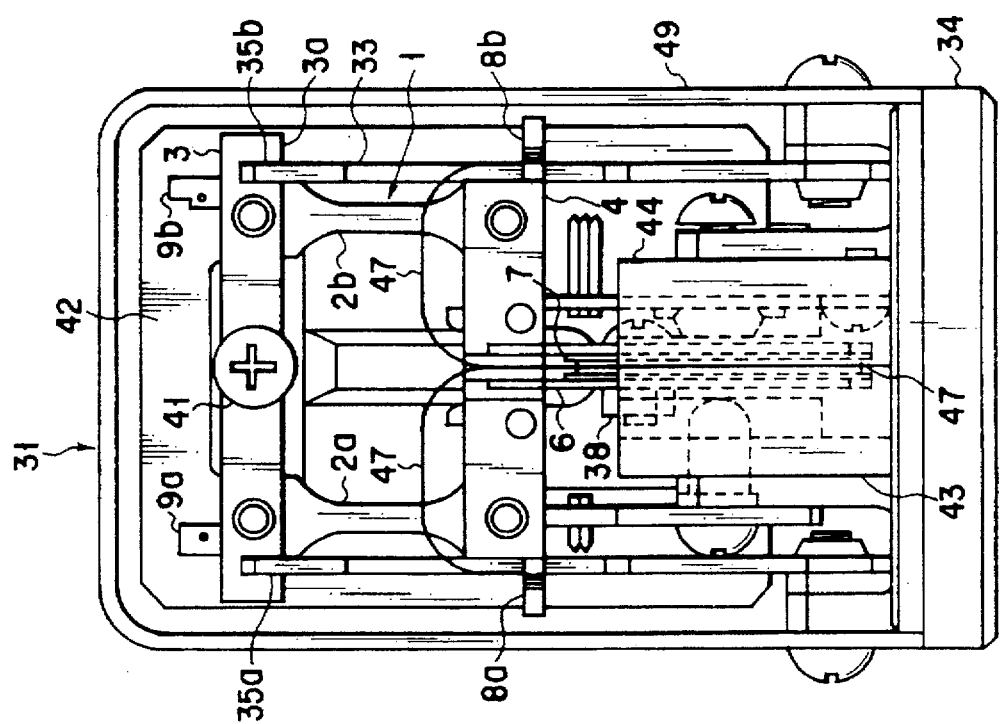
FIG. 6 is a front view of the servo acceleration sensor according to the first embodiment of the invention; .

The pendulum 5 in the pendulum assembly 1 will be explained. As shown in FIG. 6, the pendulum 5 comprises the metal plate 6, a coil bobbin 7 secured to one side of the metal plate 6 with bolts and nuts, and a torque coil of a suitable number of turns wound around the coil bobbin 7. As shown in FIG. 4, a slit 6a is made in the central portion of the metal plate 6 and holes for bolts are made in positions a specific distance apart from both ends. As shown in FIG. 6, the torque coil 47 has its leading ends connected to the connection terminals 8a and 8b of the pendulum assembly 1 and to the electric circuitry (not shown) of the printed-circuit board 42 via the plate springs 2a and 2b and the connecting wires 19a and 19b extending from the connection terminals 9a and 9b, as shown in FIG. 7. The coil bobbin 7 may be such that, for example, instead of using bolts, projections are provided on one side of the coil bobbin, holes are made in the metal plate 6 so as to fit on the projections, and the coil bobbin 7 is fitted and secured to the metal plate 6.

Explained next will be a case where the pendulum assembly 1 is attached to the pendulum assembly support frame. As shown in FIGS. 5 and 6, the pendulum assembly support frame 33 has a pair of rest sections 35a and 35b that support the base end section 3 of the pendulum assembly 1 from below. These rest sections are formed into a squared U shape. In the center of the upper end of the pendulum assembly support frame 33, a screw hole 30 is made. As shown in FIG. 3, a penetration 10 for a bolt to pass through is made in the central portion of the longitudinal side of the base end section 3 of the pendulum assembly 1.

To install the pendulum assembly 1 on the support frame 33 thus formed, both ends of the base end section 3 in the pendulum assembly 1 are placed on the inner bottoms of the rest sections 35a and 35b of the pendulum support frame 33, respectively. At the same time, as shown in FIG. 6, the base end section 3 is secured with a bolt 41, thereby mounting the pendulum assembly 1 on the support frame 33.

Because the pendulum assembly 1 is mounted on the support frame 33 in this way, even when it is installed as the bolt 41 is rotated, the assembly is prevented from being mounted with the base end section 3 inclined toward the direction in which the bolt 41 rotates, thereby making it possible to install the pendulum assembly 1 accurately on the support frame 33.

Figure 9:
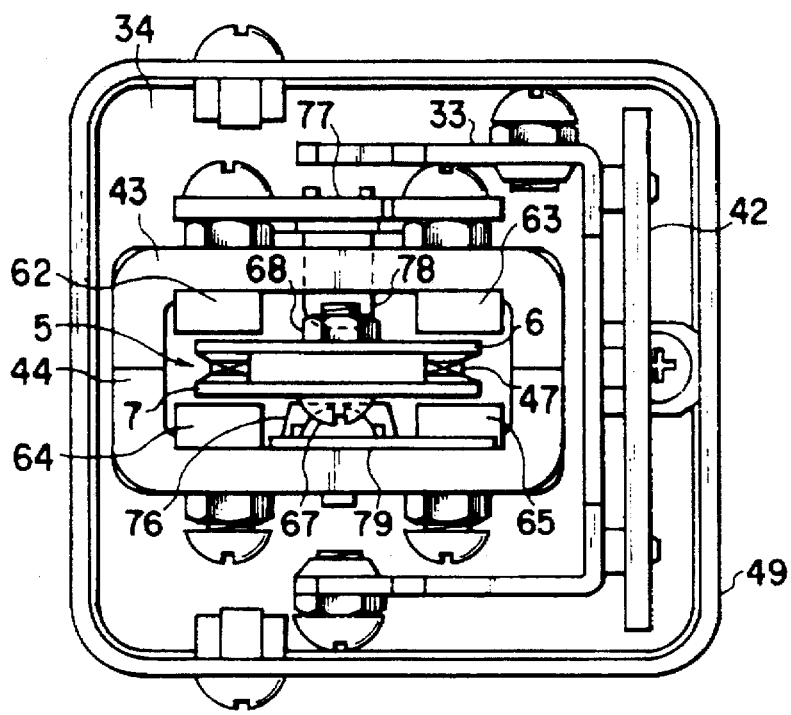
FIG. 9 is a top view of the servo acceleration sensor in the direction of the arrow A in FIG. 7.

Explained next will be the magnetic circuit formed of permanent magnets and yokes magnetically connected to the permanent magnets. As shown in FIG. 9, around the pendulum 5 composed of the metal plate 6, coil bobbin 7, and torque coil 47, permanent magnets 62, 63, 64, and 65 are each placed a specific distance apart from the pendulum 5. Two yokes 43 and 44 made of a magnetic substance are combined and provided on a base 34 so as to magnetically connect to those permanent magnets to surround the pendulum 5.

By placing the yokes 43 and 44 so as to surround the individual permanent magnets located around the pendulum in this way, a magnetic circuit is formed around the pendulum 5. For instance, if the innermost portions of the permanent magnets 62 and 65 are the N pole and the yoke-side portions of them are the S pole and the innermost portions of the permanent magnets 63 and 64 are the S pole and the yoke-side portions of them are the N pole, a magnetic circuit is formed counterclockwise around the pendulum 5 shown in FIG. 9. Therefore, when in a magnetic field caused by the magnetic circuit, current flows through the torque coil 47, magnetic force acts on the torque coil 47 by Lorenz force in the direction perpendicular to the current flow.

Explained next will be a light source and an optical sensor provided on the yokes. As shown in FIG. 9, a light source board 77 is provided outside the yoke 43. On the board, an LED 78 serving as a light source is placed so that its tip may be inserted in the yoke 43. The LED 78 is provided in a position that allows the LED to illuminate the slit made in the metal plate 6 constituting the pendulum 5 when the pendulum 5 is in a stationary state.

As shown in FIG. 9, an optical sensor board 79 is provided inside the yoke 44. On the board, an optical sensor 76 is provided in a position facing the LED 78.

The light source and optical sensor thus positioned sense the displacement of the pendulum as follows. When acceleration acts on the acceleration sensor, the pendulum 5 swings in the direction in which the acceleration acts, so that the illuminated position where the light from the LED 78 arrives at the optical sensor 76 through the slit in the metal plate 6 changes. The change is sensed by the optical sensor, which outputs an electric signal according to the displacement of the pendulum 5. The electric signal is transmitted to the circuitry on the printed-circuit board 42 of FIG. 7, which senses the displacement of the pendulum 5.

The servo acceleration sensor thus constructed senses acceleration as follows. When acceleration acts on the servo acceleration sensor 31 of FIG. 7, the pendulum 5 swings in the direction in which the acceleration acts, that is, in the direction indicated by B in FIG. 7. As a result, the illuminated position where the light emitted from the light source and passing through the slit 6a in the metal plate 6 arrives at the optical sensor deviates. Then, the optical sensor senses the deviation of the illuminated position, that is, the displacement of the pendulum 5 and outputs an electric signal according to the displacement. The electric signal is transmitted to the circuitry on the printed-circuit board 42, where the signal is amplified by various resistors, a servo amplifier, etc. The amplified signal is supplied to the torque coil 47 of FIG. 9.

When the current flows through the torque coil 47, magnetic force acts on the torque coil 47 in the above-described magnetic circuit in such a manner that the magnetic force causes the pendulum 5 to return to the original position. At the same time that the magnetic force is generated, a voltage generated across the resistor connected in series with the torque coil 47 is sensed by a sensing circuit, thereby sensing the magnitude of the acceleration.

Therefore, the servo acceleration sensor according to the embodiment produces the following effects. Since the metal plate 6 constituting the pendulum 5, the free end section 4 from which the metal plate 6 is suspended, the base end section 3 secured to the support frame 33, and the pair of plate springs connecting the free end section 4 and the base end section 3 are integrated into an entity to produce the pendulum assembly 1, the number of component parts can be reduced remarkably in manufacturing acceleration sensors. Since the pendulum assembly 1 can be mounted on the pendulum assembly support frame by securing the base end section 3 with the single bolt 41, the assembly work of acceleration sensors can be simplified, thereby improving the production efficiency.

Furthermore, the pendulum assembly 1 is secured to the support frame 33 with the bolt 41 only, so that the stress caused on the plate springs 2a and 2b due to the difference in thermal expansion between the support frame 33 and the base end section 3 can be prevented. In addition, because the coil bobbin 7 is attached to the metal plate 6 away from the free end section 4, the stress caused on the plate springs 2a and 2b due to the difference in thermal expansion between the coil bobbin 7 and the free end section 4 can be prevented.

Figure 11:
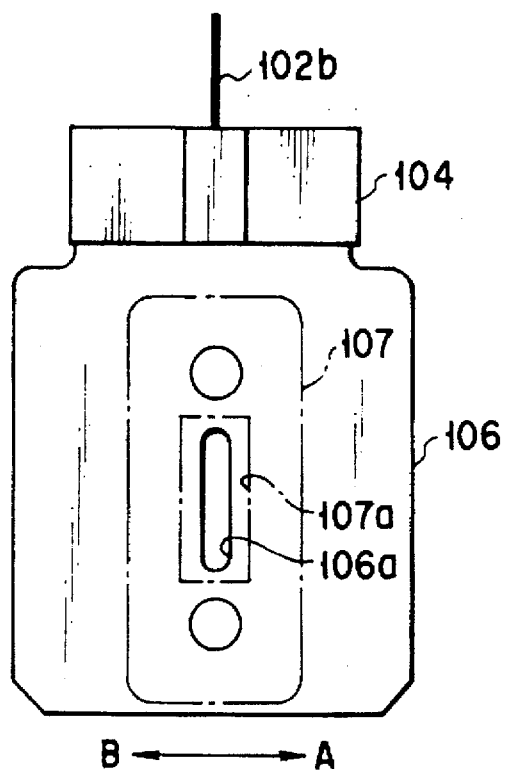
FIG. 11 is a front view of a pendulum in the servo acceleration sensor according to the second embodiment of the invention.
Figure 12:
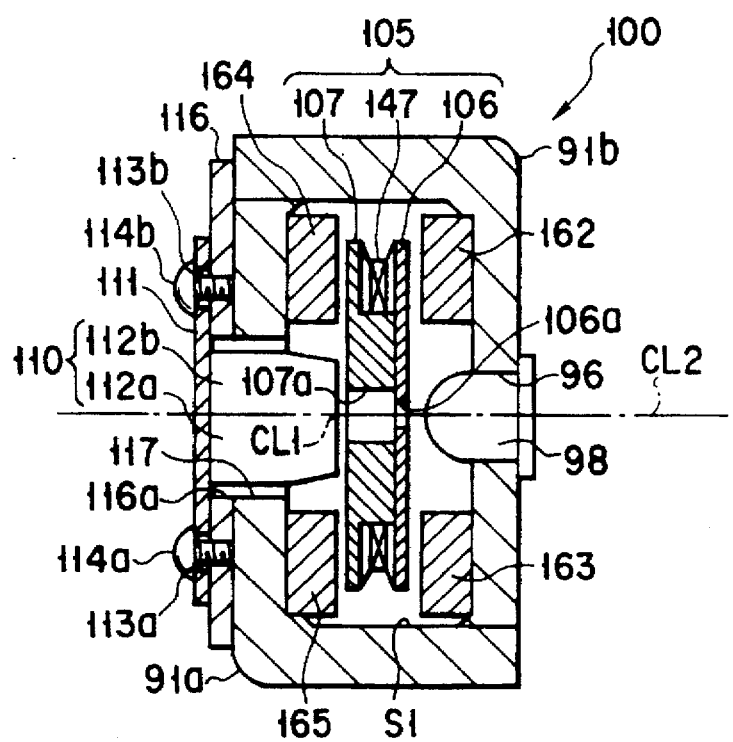
FIG. 12 is a cross-sectional view taken along line C—C of FIG. 10 showing the servo acceleration sensor.

A second embodiment of the present invention will be described with reference to FIGS. 10 to 12. The second embodiment is characterized in that the yokes and the pendulum assembly support frame are integrated into an entity.

Figure 10:
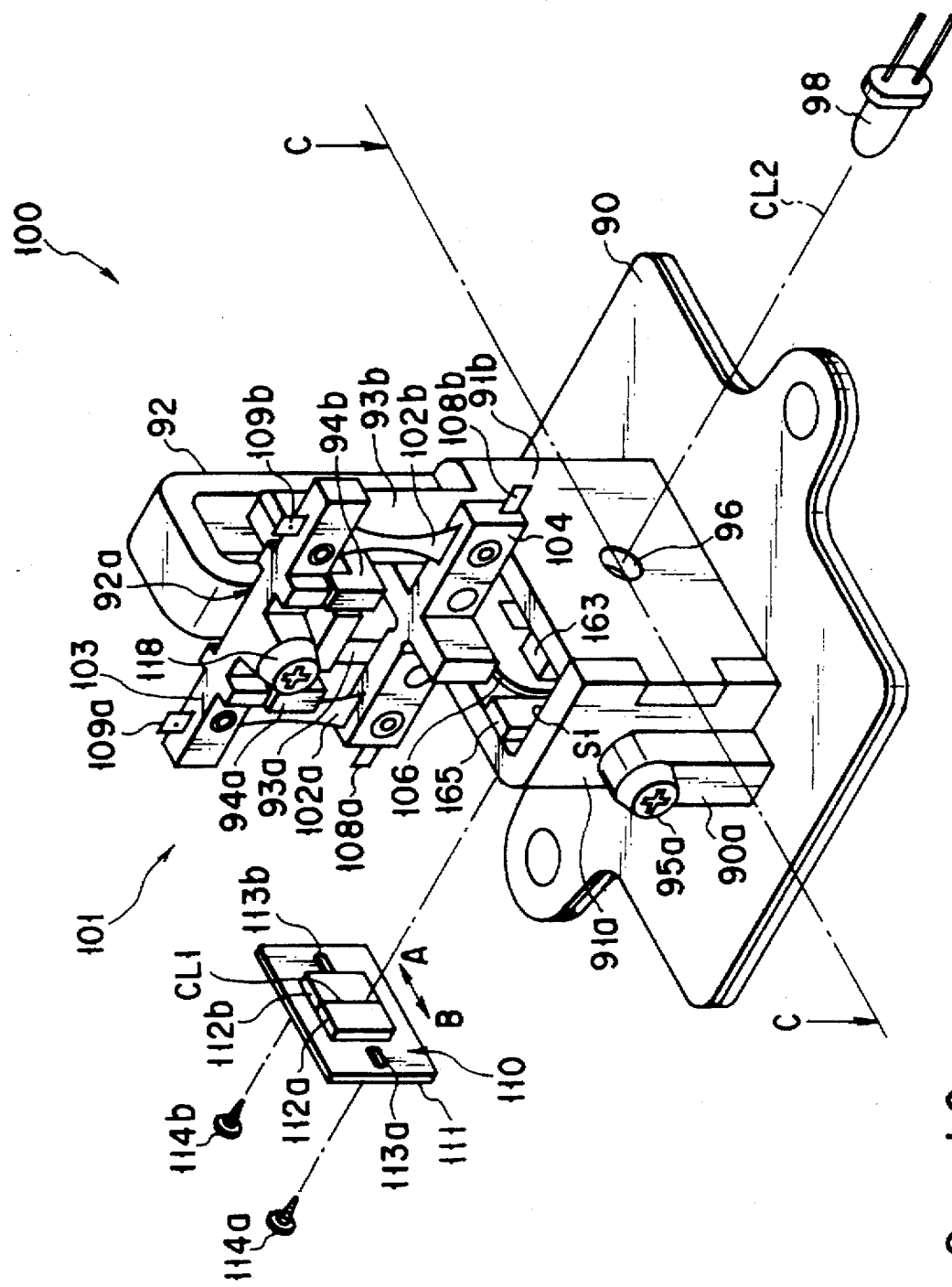
FIG. 10 is a perspective view, with portions broken away, of a servo acceleration sensor according to a second embodiment of the present invention.

FIG. 10 is a perspective view, with portions broken away, of a servo acceleration sensor according to the second embodiment. FIG. 11 is a front view of a pendulum in the acceleration sensor. FIG. 12 is a cross-sectional view taken along line C—C of FIG. 10 showing the acceleration sensor.

As shown in FIG. 10, an acceleration sensor 100 comprises a horizontal plate base 90, pendulum assembly support frame-mounted yokes 91a and 91b that are provided in an upright position on the base, a pendulum assembly 101 supported by support frames 92, 93a and 93b, permanent magnets 162, 163, 164, and 165 each separated a specific distance apart from the pendulum of the pendulum assembly 101, an LED 98 serving as a light source, and an optical sensor 110 that senses the light emitted from the LED 98.

On the base 90, a pair of yoke mounting sections projecting upward 90a and 90b (not shown) are formed as shown in FIG. 10. The yokes 91a and 91b are attached to the yoke mounting sections with bolts 95a and 95b (not shown) so that they may combine to form a pendulum housing space S1 enclosing the pendulum.

At the upper portions of these yokes 91a and 91b, the pendulum assembly support frames 93a and 92 and 93b are formed. At the tips of the support frames 93a and 93b, squared U-shaped rest sections 94a and 94b opening upward are formed respectively. The tip portion 92a of the support frame 92 is shaped into the letter J so that the tip portion may point downward above the pendulum housing space S1. The pendulum assembly 101 is mounted on the pendulum assembly support frame-mounted yokes 91a and 91b thus formed.

Figure 8:
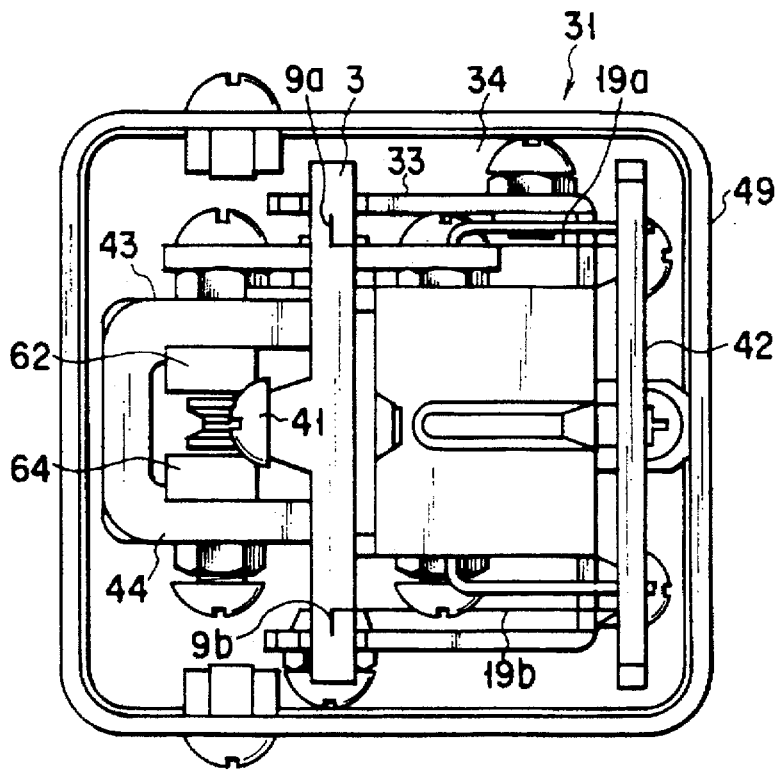
FIG. 8 is a top view of the servo acceleration sensor.

The pendulum assembly 101 is constructed in the same manner as in the first embodiment. As shown in FIG. 8, the pendulum assembly 101 comprises a metal plate (an aluminium plate) 106 composing a pendulum, a free end section 104 from the central portion of which the metal plate 106 is suspended, a base end section 103 fixed to a support frame, and a pair of plate springs 102a and 102b connecting the free end section 104 and the base end section 103. The pendulum in the pendulum assembly 101 comprises the metal plate 106 in the central portion of which a slit 106a is made, a coil bobbin 107 attached to one side of the metal plate 106 and having an opening 107a larger than the slit 106a in the center, and a torque coil wound around the coil bobbin 107, as shown in FIG. 9 in the same manner as in the first embodiment.

The pendulum assembly 101 thus constructed is mounted on the pendulum assembly support frame-mounted yokes 91a and 91b as follows. As shown in FIG. 8, the portions between the central portion of the longitudinal side of the base end section 103 in the pendulum assembly 101 and the fixed portions of the plate springs 102a and 102b are placed on the rest section 94a of the support frame 93a and on the rest section 94b of the support frame 93b, respectively. Thereafter, the base end section 103 is secured with a bolt 118, thereby mounting the pendulum assembly on the support frame 92.

Explained next will be a magnetic circuit formed by the permanent magnets placed around the pendulum. Around the pendulum 105 composed of the metal plate 106, coil bobbin 107, and torque coil 147, permanent magnets 162, 163 and 164, 165 are each placed a specific distance apart from the pendulum 105. The yokes 91a and 91b are combined on the base so as to magnetically couple with those permanent magnets to surround the pendulum 105.

By placing the yokes 91a and 91b so as to surround the individual permanent magnets in this way, a magnetic circuit is formed around the pendulum 105. For instance, if the innermost portions of the permanent magnets 162 and 165 are the N pole and the yoke-side portions of them are the S pole and the innermost portions of the permanent magnets 163 and 164 are the S pole and the yoke-side portions of them are the N pole, a magnetic circuit is formed counter-clockwise around the pendulum 105 shown in FIG. 12. Therefore, when in a magnetic field caused by the magnetic circuit, current flows through the torque coil 147, magnetic force acts on the torque coil 147 by Lorenz force in the direction perpendicular to the current flow.

Explained next will be a light source provided in the yoke. As shown in FIG. 10, in the pendulum assembly support free-mounted yoke 91b, a light-source mounting hole 96 is made. When the light-source mounting hole has been made in the yoke previously, this makes it unnecessary to adjust the position of the light source by moving the light source after the yokes 91a and 91b have been mounted on the base 90. In addition, an LED 98 serving as a light source can be provided in the yoke easily. Therefore, the positional adjustment between the light source and the optical sensor placed so as to face the light source can be effected easily.

Explained next will be the optical sensor placed on the yoke. As shown in FIG. 10, the optical sensor 110 is bisected along the center line CL1 and is composed of a first optical sensor 112a and a second optical sensor 112b, which are provided on an optical sensor board 111. In both ends of the optical sensor board 111, oblong mounting holes 113a and 113b are made.

The optical sensor board 111 on which the optical sensor is provided is mounted on the yoke 91a as follows. After the yokes 91a and 91b have been combined, an optical sensor mounting plate 116 in the central portion of which an optical sensor mounting hole 116a is made is bonded to one side of the yoke 91a in which an optical sensor mounting hole 117 is made, as shown in FIG. 12. Then, the optical sensor board 111 of the optical sensor mounting plate 116 is secured with screws 114a and 114b.

To manufacture high-accuracy acceleration sensors, it is necessary to position the slit 106a in the metal plate 106 constituting the pendulum, the light source 98, and the optical sensor 110 on the center line CL2 in FIG. 10 with a high accuracy (hereinafter, adjusting the pendulum, light source, and optical sensor in this way is referred to as zero adjustment). In the present embodiment, because the light source is fixed in a specific position, the pendulum assembly 101 is mounted on the support frame 92 and then the position of the optical sensor 110 is adjusted as follows.

Specifically, since the board mounting holes 113a and 113b are made oblong in both ends of the optical sensor board 111, loosening the screws 114a and 114b enables the optical sensor board 111 to be moved easily in the direction in which the pendulum 105 swings (in the direction of the arrow A-B in the figure) along the board mounting holes 113a and 113b. Tightening the screws 114a and 114b enables the optical sensor board 111 to be secured in the position where the screws are tightened. Therefore, the optical sensor 110 can be moved in the direction in which the pendulum 105 swings and positioned there as desired.

With the servo acceleration sensor thus constructed, too, the magnitude of acceleration can be sensed in the same manner as in the first embodiment.

In the servo acceleration sensor according to the present embodiment, as shown in FIG. 10, the pendulum assembly support frames 92a, 93a, and 93b are formed integrally with the yokes 91a and 91b, so that number of assembly processes can be reduced as compared with conventional equivalents. Furthermore, the two yokes 91a and 91b are combined into an entity, which is then mounted on the base 90, so that the yokes are easy to mount. Since there is no need to mount the yokes 91a and 91b and the pendulum assembly support frames 92 separately on the base 90, assembly errors can be prevented. Therefore, because each component part can be assembled accurately, high-accuracy acceleration sensors can be manufactured.

Figure 18:
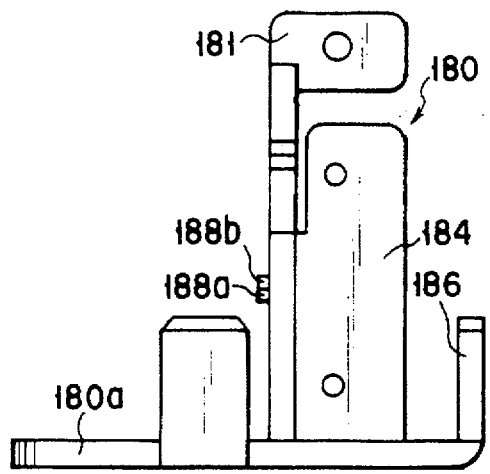
FIG. 18 is a front view of a yoke-mounted base in the servo acceleration sensor according to an embodiment of the invention.

Referring to FIGS. 13 to 25, a third embodiment of the present invention will be explained. The third embodiment is characterized in that the base, the yokes, and the support frees for the pendulum assembly are integrated into an entity. FIG. 18 is a front view of a yoke-mounted base in the servo acceleration sensor according to the embodiment. FIGS. 19, 20, 21, and 22 are a top view, a rear elevation, a right side view, and a left side view of the yoke-mounted base.

In the servo acceleration sensor according to the present embodiment, as shown in FIGS. 18 to 22, a base 180 is composed of a base section 180a, yoke sections 183 and 184, and a pendulum assembly support frame section 182. Two units of such a base are combined to produce a base that has not only a yoke function but also a support frame function for the pendulum assembly.

Figure 19:
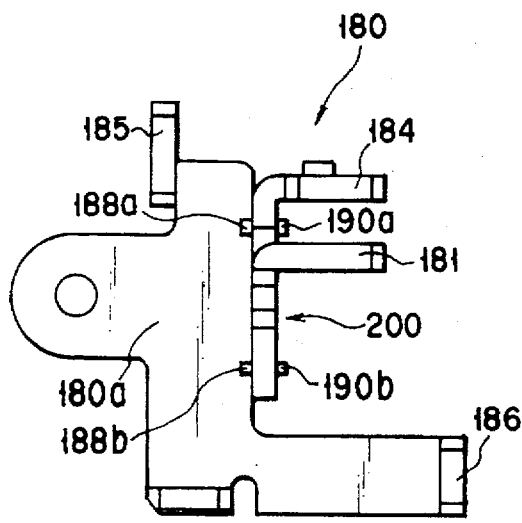
FIG. 19 is a top view of the yoke-mounted base.
Figure 20:
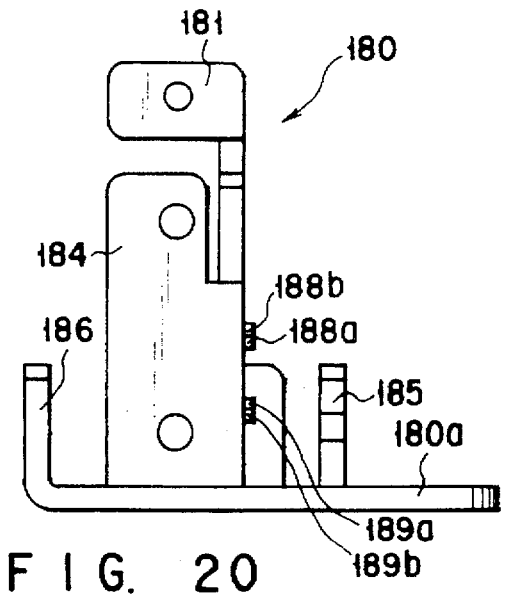
FIG. 20 is a rear elevation of the yoke-mounted base.

As shown in FIG. 19, the base section 180a is formed into a L-shaped plate. At the two tip portions of the L shape, base connecting sections 185 and 186 for combining and fixing the bases together are formed.

Figure 21:
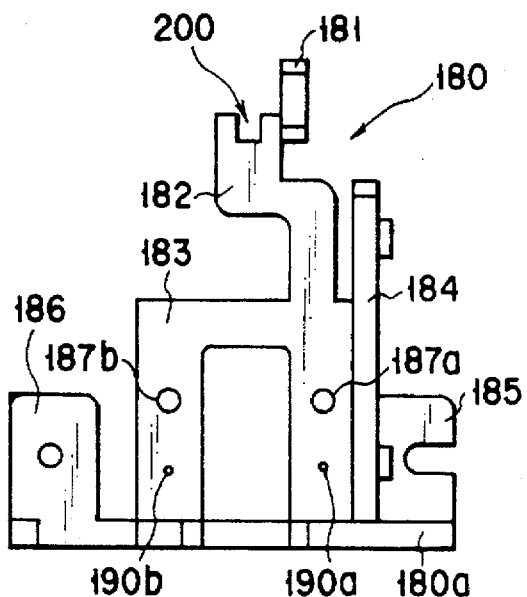
FIG. 21 is a right side view of the yoke-mounted base.

The yoke section 183 is formed into a squared U-shape opening downward as shown in FIG. 21. In the right and left legs of the U-shaped yoke section, screw holes 187a and 187b used to mount a light source or an optical sensor board are made. Also, on the right and left legs, dowels (projections) 190a and 190b for positioning permanent magnets after moving them vertically are formed.

Figure 22:
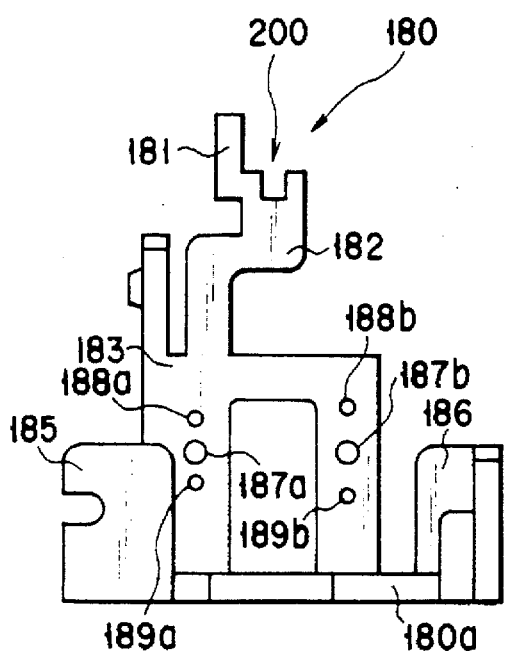
FIG. 22 is a left side view of the yoke-mounted base.

On the back of the yoke section, dowels 188a, 188b, 189a, and 189b serving as a guide installing the board are formed as shown in FIG. 22.

Furthermore, a support frame section 182 for the pendulum assembly is formed so as to extend upward from the top of the yoke section 183 as shown in FIG. 21. At the tip of the support frame section, a squared U-shaped rest section 200 opening upward is formed. On one side of the rest section 200, a pendulum assembly mounting section 181 is formed. The base 180 is formed by press-molding or cutting a magnetic material.

Two bases of the same shape thus formed are combined in such a manner that a base connecting section 186 in which screw holes are made is brought into contact with a base connecting section 185 in which a U-shaped cutout is made as shown in FIG. 21 and are fixed together with bolts.

Figure 24:
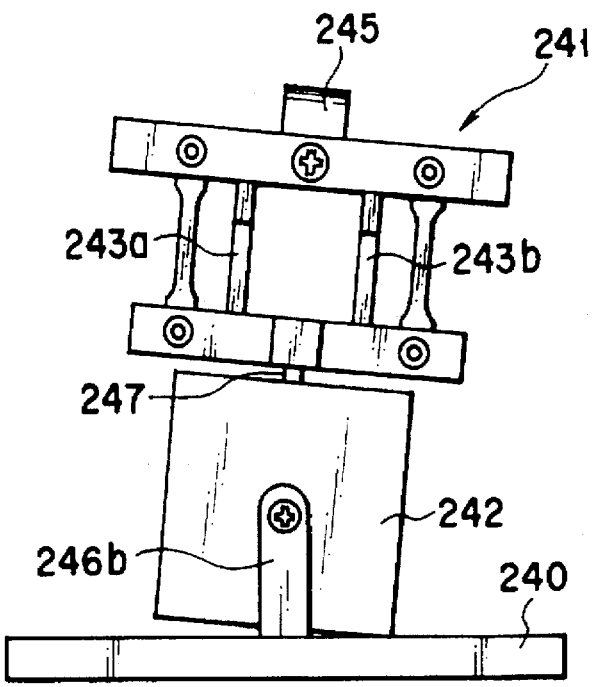
FIG. 24 is a front view of the servo acceleration sensor with a yoke-mounted base.
Figure 25:
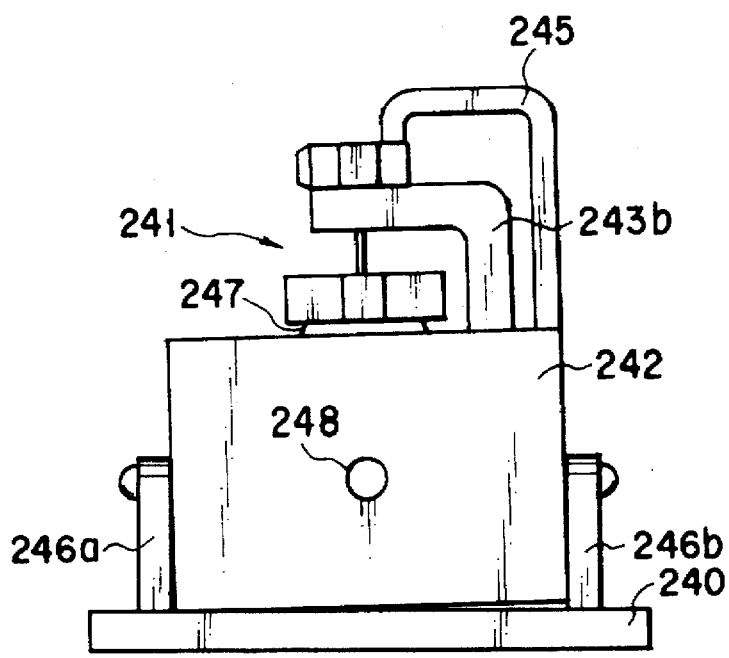
FIG. 25 is a side view of the servo acceleration sensor.

By integrating the bases, the yokes, and the pendulum assembly support frames into an entity, the following problems can be solved. FIGS. 24 and 25 are a front view and a side view of the servo acceleration sensor with the yoke-mounted base. As shown in FIGS. 24 and 25, when the base 240 and the yoke 242 are separate, there may be a case where the yoke 242 is mounted on the mounting sections 246a and 246b of the base 240 in an inclined position. Once the yoke 242 is mounted in an inclined position, variations in the sensitivity of the acceleration sensor or variations in the zero point offset will occur. It will take time to correct these variations.

To overcome this problem, by integrating the bases, the yokes, and the pendulum assembly support frames into an entity as in the present embodiment, it is possible to eliminate errors in the accuracy of the acceleration sensor due to mounting and therefore manufacture high-accuracy acceleration sensors.

Figure 13:
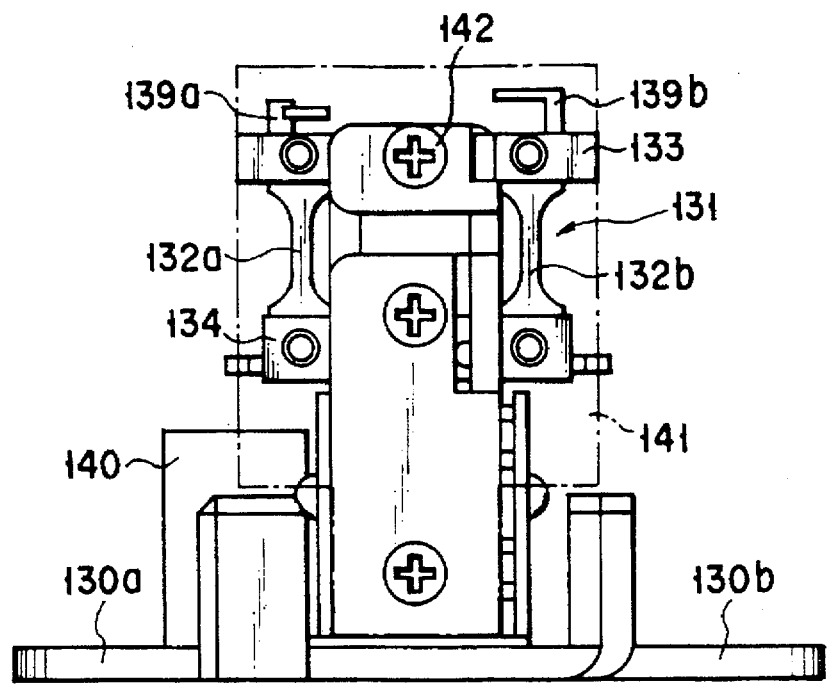
FIG. 13 is a front view of the servo acceleration sensor according to an embodiment of the present invention.

Explained next will be a servo acceleration sensor with a base formed as described above. FIG. 13 is a front view of a servo acceleration sensor according to the present embodiment. FIGS. 14 to 17 are a top view, a rear elevation, a right side view, and a left side view of the servo acceleration sensor. To clarify the locations of the respective component parts, the printed-circuit board is indicated by one-dot-dash lines in FIG. 13.

Figure 14:
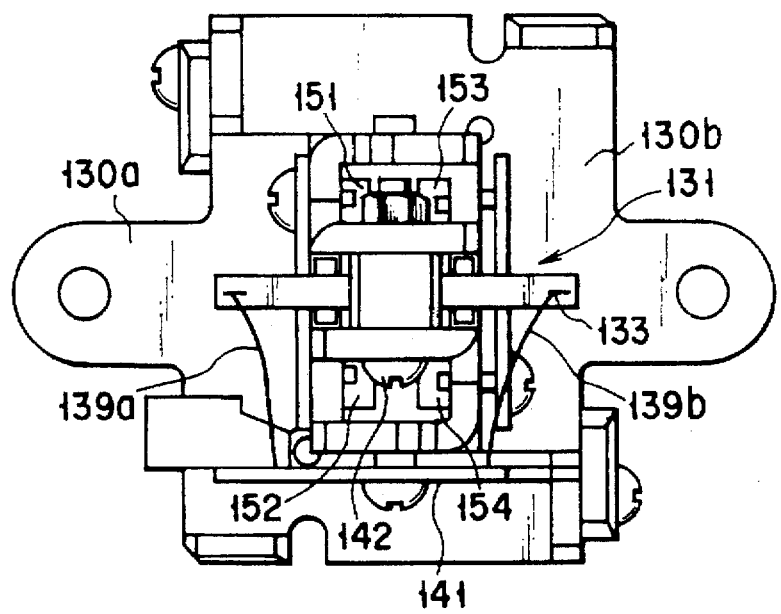
FIG. 14 is a top view of the servo acceleration sensor.
Figure 17:
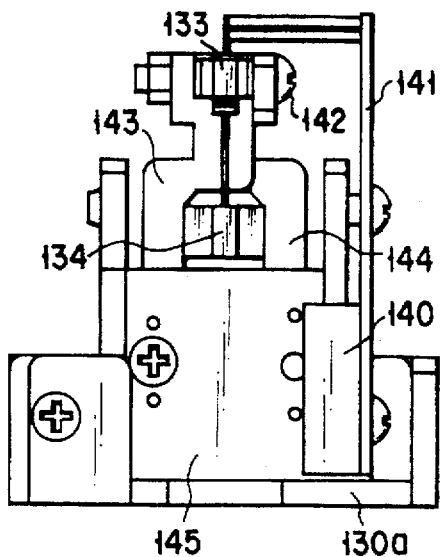
FIG. 17 is a left side view of the servo acceleration sensor.

As shown in FIG. 14, after two bases 130a and 130b have been combined, a pendulum assembly 131 is suspended from the support frame 143 of the bases in a space formed in the central portion. The pendulum assembly 131 is constructed in the same manner as in the first embodiment. Specifically, as shown in FIG. 13, the pendulum assembly comprises a metal plate constituting a pendulum, a free end section 134 from the central portion of which the metal plate is suspended, a base end section 133 supported by the support frame sections of the bases 130a and 130b, and a pair of plate springs 132a and 132b that connect the free end section 134 and the base end section 133. These component parts are integrated into an entity. The metal plate is provided with a coil bobbin, around which a torque coil is wound, thereby forming a pendulum.

As shown in FIG. 14, around the pendulum, permanent magnets 151, 152, 153, and 154 are each placed a specific distance apart from the pendulum. These permanent magnets are magnetically coupled with the yoke sections of the bases 130a and 130b, thereby forming a magnetic circuit. As in the first embodiment, in the magnetic circuit, current flows through the torque coil, magnetic force acts on the torque coil by Lorenz force in the direction perpendicular to the current flow.

Figure 23:
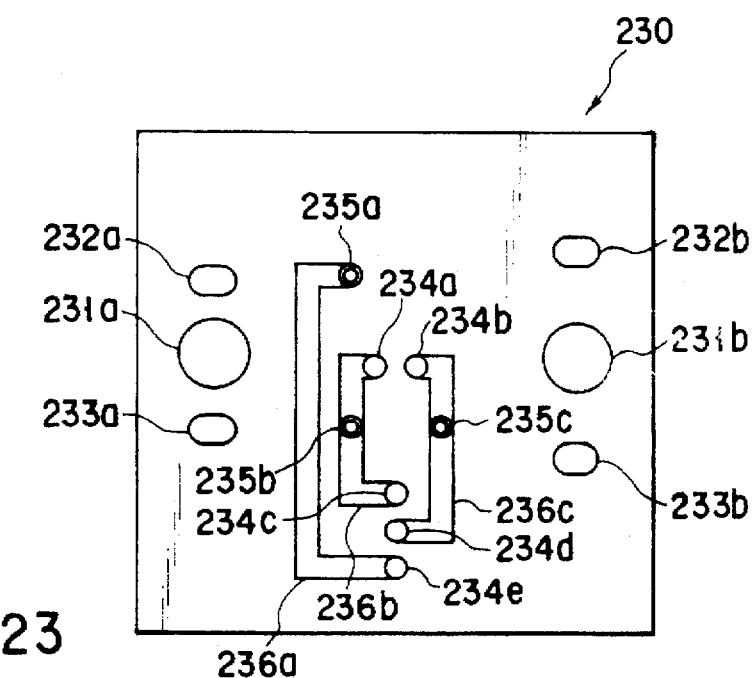
FIG. 23 is a plan view of a PD.LED substrate in the servo acceleration sensor according to an embodiment of the invention.

Explained next will be a board on which a light source and an optical sensor are mounted. FIG. 23 is a plan view of a light source and optical sensor board in the servo acceleration sensor according to the present embodiment. As shown in FIG. 23, in both ends of the light source and optical sensor board 230, a pair of mounting holes 231a and 231b are made. Also, on both ends, dowel insert holes 232a 233a and dowel insert holes 232b and 233b are formed so as to sandwich the mounting holes with a specific distance between them, respectively.

In the central portion of the board 230, for example, wiring patterns 236a, 236b, and 236c are formed as shown in FIG. 23. At the tip of each wiring pattern, light-source terminal fitting holes 234a and 234b and connecting wire holes 234c, 234d, and 234e used to electrically connect the board are made. The terminals of an optical sensor are connected to optical sensor terminal fitting sections 235a, 235b, and 235c on the wires of the individual wiring patterns or at the tips of the wires.

Since the light-source terminal fitting holes 234a and 234b have been made in the board 230 and the wiring patterns 236a to 236c have also been formed on the board 230 previously, the board can be used as both a light-source board and an optical sensor board.

Specifically, when the board 230 is used as a light-source board, light source terminals are fitted in the light-source terminal fitting holes 234a and 234e and this board is mounted on the yoke section 183 of the base 180 shown in FIG. 22. In this case, the dowels 188a, 188b, 189a, and 189b shown in FIG. 22 are not inserted in the dowel insert holes 232a, 232b, 233a, and 233b in the board 230, and the yoke section 183 is mounted on the board 230 so that the former may be as much a distance as a height of the dowels apart from the latter. Therefore, even when an LED to be used with the board 230 is a commercially available infrared LED, the LED can be prevented from coming into contact with the pendulum by setting the flange portion free.

When the board 230 is used as an optical sensor, a single optical sensor is fixed in the position on the board corresponding to the fitted light source and this board is attached to the yoke section of the base different from the base to which the light-source board is attached. In this case, unlike the light-source board, the dowels 188a, 188b, 189a, and 186b shown in FIG. 22 are inserted in the dowel insert holes 232a, 232b, 233a, and 233b and the board 230 is mounted on the yoke section 183 so as to be in close contact. At this time, each dowel functions as a guide for mounting the optical sensor board. Since the lower portion of the board 230 is formed so as to come into contact with the base section 180a and the dowel insert holes 232a, 232b, 233a, and 233b in the board 230 have the major axis in the direction in which the pendulum swings, the board 230 also functions as a guide in determining a position after movement.

When acceleration acts on the acceleration sensor of the above configuration, the pendulum in the pendulum assembly 131 shown in FIG. 13 swings in the direction in which acceleration acts, and the optical sensor senses the displacement of the pendulum. The electric signal from the optical sensor is transmitted via the wire and an input/output connector 140 shown in FIG. 13 to the circuitry on the printed-circuit board 141. In this way, the electric current transmitted to the printed-circuit board 141 enables the magnitude of acceleration to be sensed as in the first embodiment.

With the servo acceleration sensor according to the present embodiment, since the bases, the yokes, and the support frames for the pendulum assembly are integrated into an entity as shown in FIG. 21, misalignment in assembly can be prevented. Furthermore, the same board can be uses as both a light-source board and an optical sensor and various patterns can be selected, depending on component parts to be used, so that the production cost of boards can be suppressed.

Hereinafter, referring to FIGS. 26 to 30, a fourth embodiment of the present invention will be explained. The fourth embodiment is characterized in that a tilt angle is computed using two units of the sensor used in one of the first to third embodiments.

Figure 26:
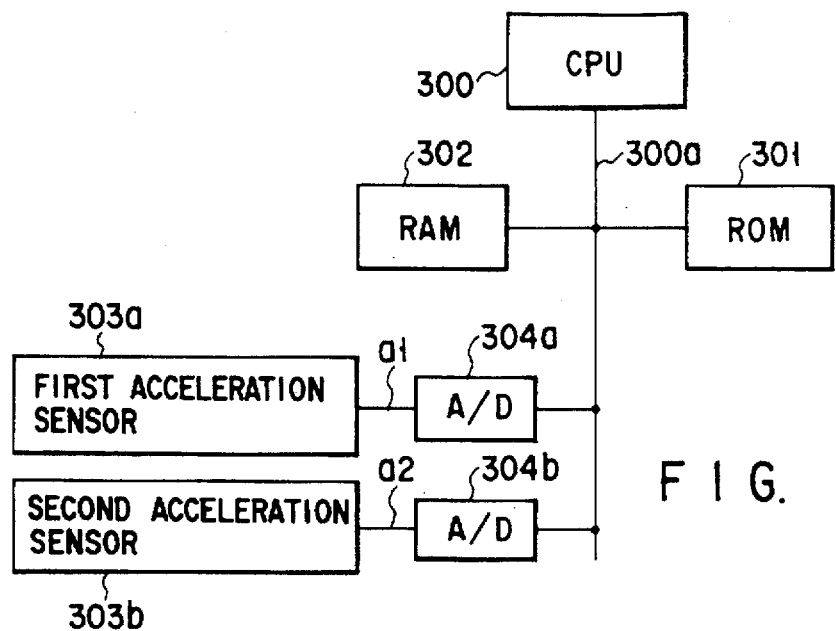
FIG. 26 is a block diagram of a tilt-angle computing device according to the present invention, showing the system configuration.

FIG. 26 is a block diagram of a tilt-angle computing device, showing the configuration. In FIG. 26, numeral 300 indicates a CPU (central processing unit) that controls the overall operation of the tilt-angle computing device. To a system bus 300a from the CPU 300, a ROM (read only memory) 301 that stores programs for executing the processes shown in the flowchart in FIG. 27 and a RAM 302 are connected. The acceleration a1 sensed by a first acceleration sensor 303a explained later is also connected via an A/D (analog/digital) converter 304a to the system bus. The acceleration a2 sensed by a second acceleration sensor 303b explained later is also connected via an A/D (analog/digital) converter 304b to the system bus.

The first acceleration sensor 303a and the second acceleration sensor 303b use two units of the acceleration sensor used in one of the first to third embodiments.

The A/D converter 304a converts the acceleration signal a1 outputted from the first acceleration sensor 303a into a digital signal. The A/D converter 304b converts the acceleration signal a2 outputted from the second acceleration sensor 303b into a digital signal.

Figure 28:
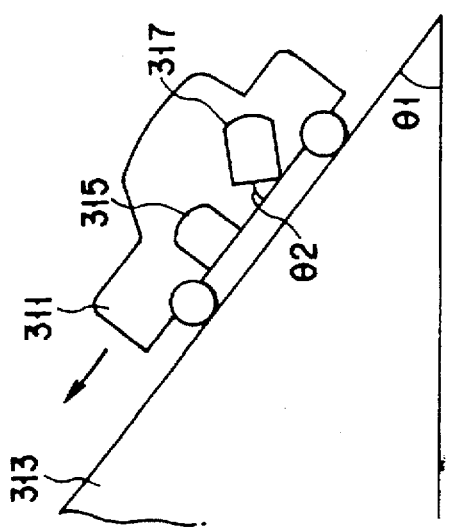
FIG. 28 shows a case where a vehicle is equipped with two acceleration sensors used in the tilt-angle computing device.

FIG. 28 shows a case where a vehicle is equipped with two acceleration sensors used in the tilt-angle computing device.

The tilt angle computing device using the acceleration sensor shown in the figure is fitted in a vehicle 311 and computes a tilt angle $\theta_1$ of a slope 313 as the vehicle 311 moves on the slope 313. On the basis of the tilt angle $\theta_1$, the device determines the moving distance $L_S$ when the vehicle moves on the slope 313. The device is applied to a navigation system, for example.

The tilt-angle computing device shown in FIG. 28 has a first acceleration sensor 315 mounted in parallel with the direction in which the vehicle 311 advances, and a second acceleration sensor 317 mounted at a specific angle of $\theta_2$ to the direction in which the vehicle advances.

Explained next will be a method of computing the tilt angle $\theta_1$ of the slope 313 when the vehicle 311 goes up the slope 313, using the first and second acceleration sensors 315, 317 mounted as described above.

In a case where the vehicle 311 is going up the slope 313, if the acceleration of the vehicle 311 generated by the engine of the vehicle 311 is $a_E$ and gravity is g, a first acceleration $a_1$ outputted from the first acceleration sensor 315 will be expressed as:

$$a_1 = a_E + g \sin \theta_1 \quad (1)$$

In this case, a second acceleration $a_2$ outputted from the second acceleration sensor 317 will be expressed as:

$$a_2 = a_E \cos \theta_2 + g \sin(\theta_1 + \theta_2) \quad (2)$$

Equation (1) multiplied by cos θ2 is subtracted from equation (2) and the result is simplified, giving the equation:

$$a_2 - a_1 \cos\theta_2 = g\{\sin(\theta_1 + \theta_2) - \sin\theta_1 \cdot \cos\theta_2\}$$
$$= g\cos\theta_1 \sin\cdot\theta_2$$

Solving for $\cos \theta_1$ gives the equation:

$$\cos \theta_1 = (a_2 - a_1 \cos \theta_2)/g \sin \theta_2$$

Therefore, the tilt angle $\theta_1$ of the slope 313 is expressed as:

$$\theta_1 = \cos^{-1}\{(a_2 - a_1 \cos \theta_2)/g \sin \theta_2\} \quad (3)$$

In the equation of the tilt angle θ, since the first acceleration $a_1$, the second acceleration $a_2$, and the mounting tilt angle $\theta_2$ of the second acceleration sensor 317 are known, the tilt angle $\theta_1$ of the slope 313 can be determined using equation (3). The tilt angle $\theta_1$ can be calculated by inputting the first and second accelerations $a_1$ and $a_2$ from the first and second acceleration sensors 315 and 317 to computing means (not shown) provided in the vehicle 311. Although the case where the vehicle 311 goes up the slope 311 has been explained, the same explanation holds true for the case where the vehicle 311 goes down the slope 311, so that its explanation will be omitted. Furthermore, when the vehicle 311 is at a standstill on the slope 313, the tilt angle can be obtained in the same manner by substituting 0 for the acceleration $a_E$ in the above calculations.

Explained next will be a method of determining the moving distance of the vehicle 311 from the tilt angle $\theta_1$ of the slope 313 thus obtained.

From equation (1), the actual acceleration $a_E$ of the vehicle 311 along the slope is expressed as:

$$a_E = a_1 - g \sin \theta_1 \quad (4)$$

Since the moving distance $L_S$ in the case where the vehicle 311 runs on the slope 313 with a tilt angle of $\theta_1$ is determined in the form of an acceleration component and a constant-speed running component by double integral of acceleration $a_E$ in equation (4), the moving distance is expressed as:

$$L_S = a_E t_1^2/2 + a_E t_1 t_2 \quad (5)$$
$$= (a_1 - g\sin\theta_1)t_1^2/2 + (a_1 - g\sin\theta_1)t_1 t_2$$

where $t_1$ is the acceleration time and $t_2$ is the constant-speed running time.

In the equation, the tilt angle $\theta_1$ of the slope 313 can be determined from equation (3) and acceleration $a_1$ is the output of the first acceleration sensor 315, so that the moving distance $L_S$ in the case where the vehicle 311 runs on the slope 313 can be determined from the above equation.

The moving distance in the case where the vehicle 311 runs on a level road can be determined by solving for the case where the tilt angle $\theta_1$ is 0 ($\theta_1 = 0$), so that from equation (4), the acceleration $a_E$ of the vehicle 311 is expressed as:

$$a_E = a_1$$

Therefore, the moving distance $L_F$ in this case can be determined in the form of an acceleration component and a constant-speed running component by double integral of acceleration $a_E$ of the vehicle 311, so that the moving distance $L_F$ is expressed as:

$$L_F = a_1 t_1^2/2 + a_1 t_1 t_2 \quad (6)$$

With the tilt-angle computing device according to the invention, gravity correction is made and the actual moving distance without errors is computed. Explained next will be a case where no gravity correction is effected. Then, the difference between those two cases will be considered.

First, the moving distance $L_s'$ without gravity correction in the case where the vehicle runs on a slope with a tilt angle of $\theta_1$ can be determined in the form of an acceleration component and a constant-speed running component by double integral of acceleration $a_1$ in equation (1), so that the moving distance $L_S'$ is expressed as:

$$L_S' = (a_E + g\sin\theta_1)t_1^2/2 + (a_E + g\sin\theta_1)t_1 t_2 = a_1 t_1^2/2 + a_1 t_1 t_2 \quad (7)$$

The moving distance $L_F'$ of the vehicle without gravity correction in the case of a level road requires no tilt angle factor, so that the moving distance $L_F'$ is identical with what is expressed by equation (6).

As described above, when the moving distance $L_S'$ in equation (7) without gravity correction on a slope is compared with the moving distance $L_S$ in equation (5) on the tilt-angle computing device of the present invention with gravity correction, the difference is expressed as:

$$L_S' - L_S = g \sin\theta_1 \cdot t_1^2/2 + g \sin\theta_1 \cdot t_1 t_2 \quad (8)$$

Namely, by making gravity correction in computing the moving distance on the slope 313 as does the tilt-angle computing device of the invention, an error expressed by equation (8) can be corrected.

Using a practical example, explanation will be given as to a case where the moving distance $L_S'$ in equation (7) without gravity correction on a slope is compared with the moving distance $L_S$ in equation (5) on the tilt-angle computing device of the present invention with gravity correction.

Figure 29:
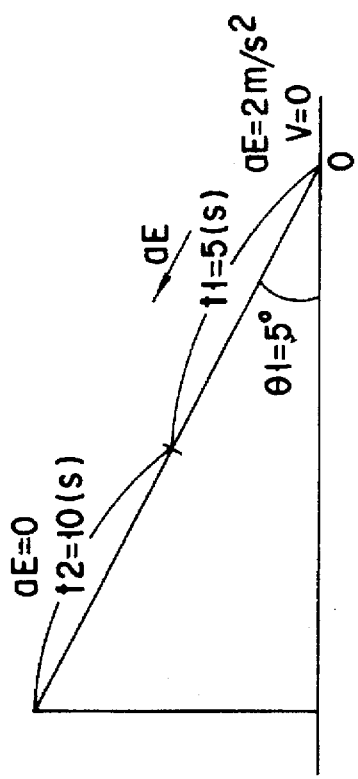
FIG. 29 shows a slope to help explain the comparison of the moving distance $L_S$ on the tilt-angle computing device of the invention making gravity correction with the moving distance $L_S'$ without gravity correction.

In a case where as shown in FIG. 29, on a slope with a tilt angle of $\theta_1=5°$, a vehicle runs at an acceleration $a_E=2$ m/s² with an initial speed $v=0$ for time $t_1=5$ (s), and thereafter runs at an acceleration $a_E=0$ for time $t_2=10$ (s), the moving distance $L_S'$ in equation (7) without gravity correction will be compared with the moving distance $L_S$ in equation (5) on the tilt-angle computing device of the invention making gravity correction by means of the second acceleration sensor 317 with a tilt angle of $\theta_2=30°$.

The moving distance $L_S'$ in equation (7) without gravity correction is expressed as:

$$\begin{aligned}L_S' &= (a_E + g\sin\theta_1)t_1^2/2 + (a_E + g\sin\theta_1)t_1t_2 \\ &= (2 + 9.8\sin5°) \times 25/2 + \\ &\quad (2 + 9.8\sin5°)5 \times 10 \\ &= 35.7 + 142.7 \\ &= 178.4\ (m)\end{aligned}$$

In contrast, the moving distance $L_S$ in equation (5) on the tilt-angle computing device of the invention with gravity correction is expressed as:

$$\begin{aligned}L_S &= a_E t_1^2/2 + a_E t_1 t_2 \\ &= 2 \times 5^2/2 + 2 \times 5 \times 10 \\ &= 25 + 100 \\ &= 125\ (m)\end{aligned}$$

Specifically, the difference between the moving distance $L_S'$ in equation (7) without gravity correction on a slope and the moving distance $L_S$ in equation (5) on the tilt-angle computing device of the invention with gravity correction is expressed as:

$$L_S' - L_S = 178.4 - 125 = 53.4\ (m)$$

Figure 30:
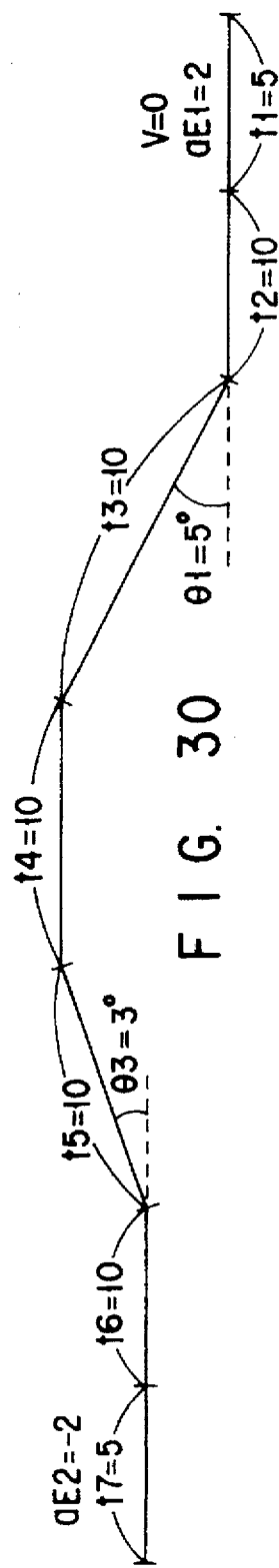
FIG. 30 shows a path including slopes and level roads to help explain the comparison of the moving distance $L_S$ on the tilt-angle computing device of the invention making gravity correction with the moving distance $L_S'$ without gravity correction.

Furthermore, in a case where a vehicle runs on a road including slopes as shown in FIG. 30, the moving distance $L_S'$ in equation (7) without gravity correction on a slope will be compared with the moving distance $L_S$ in equation (5) on the tilt-angle computing device of the present invention with gravity correction. Here, in FIG. 30, it is assumed that the vehicle runs at an acceleration of $a_{E1}=2$ (m/s²) for time $t_1=5$ (s) with an initial speed of $v=0$, runs at a constant speed for time $t_2=10$ (s), runs on a slope with a tilt angle of $\theta_1=5°$ at a constant speed for time $t_3=10$ (s), runs at a constant speed for time $t_4=10$ (s), runs on a slope with a tilt angle of $\theta_3=3°$ for time $t_5=10$ (s), runs at a constant speed for time $t_6=10$ (s), and runs at an acceleration of $aE_2=-2$ (m/s²) for time $t_7=5$ (s).

The moving distance $L_S'$ in equation (7) without gravity correction is expressed as follows (where subscripts 1 to 7 indicate the individual sections for times $t_1$ to $t_7$):

$$\begin{aligned}L_{S1} &= a_1 t_1^2/2 & a_1 &= a_{E1} = 2 \\ L_{S2} &= a_2 t_2^2/2 + a_1 t_1 t_2 & a_2 &= 0 \\ L_{S3} &= a_3 t_3^2/2 + a_1 t_1 t_3 & a_3 &= g\sin\theta_1 \\ L_{S4} &= a_4 t_4^2/2 + a_1 t_1 t_4 & a_4 &= 0 \\ L_{S5} &= a_5 t_5^2/2 + a_1 t_1 t_5 & a_5 &= -g\sin\theta_3 \\ L_{S6} &= a_6 t_6^2/2 + a_1 t_1 t_6 & a_6 &= 0 \\ L_{S7} &= a_7 t_7^2/2 + a_1 t_1 t_7 & a_7 &= a_{E2} = -2\end{aligned}$$

Therefore, the length $L_{S'total}$ of the overall path is expressed as:

$$\begin{aligned}L_{S'total} &= L_{S1} + L_{S2} + L_{S3} + L_{S4} + \\ &\quad L_{S5} + L_{S6} + L_{S7} \\ &= 25 + 100 + 142.7 + 100 + \\ &\quad 74.4 + 100 + 25 \\ &= 567.1\ (m)\end{aligned}$$

In contrast, the moving distance $L_S$ in equation (5) on the tilt-angle computing device of the present invention with gravity correction is expressed as:

$$\begin{aligned}L_{S1} &= a_1 t_1^2/2 & a_1 &= a_{E1} = 2 \\ L_{S2} &= a_2 t_2^2/2 + a_1 t_1 t_2 & a_2 &= 0 \\ L_{S3} &= a_3 t_3^2/2 + a_1 t_1 t_3 & a_3 &= 0 \\ L_{S4} &= a_4 t_4^2/2 + a_1 t_1 t_4 & a_4 &= 0 \\ L_{S5} &= a_5 t_5^2/2 + a_1 t_1 t_5 & a_5 &= 0 \\ L_{S6} &= a_6 t_6^2/2 + a_1 t_1 t_6 & a_6 &= 0 \\ L_{S7} &= a_7 t_7^2/2 + a_1 t_1 t_7 & a_7 &= a_{E2} = -2\end{aligned}$$

Therefore, the length $L_{Stotal}$ of the overall path is expressed as:

$$\begin{aligned}L_{Stotal} &= L_{S1} + L_{S2} + L_{S3} + L_{S4} + L_{S5} + L_{S6} + L_{S7} \\ &= 25 + 100 + 100 + 100 + 100 + 100 + 25 \\ &= 550\ (m)\end{aligned}$$

Accordingly, the difference between the moving distance $L_S'$ without gravity correction on the road including slopes shown in FIG. 30 and the moving distance $L_S$ according to the invention with gravity correction is expressed as:

$$L_S' - L_S = 567.1 - 550 = 17.1\ (m)$$

Figure 27:
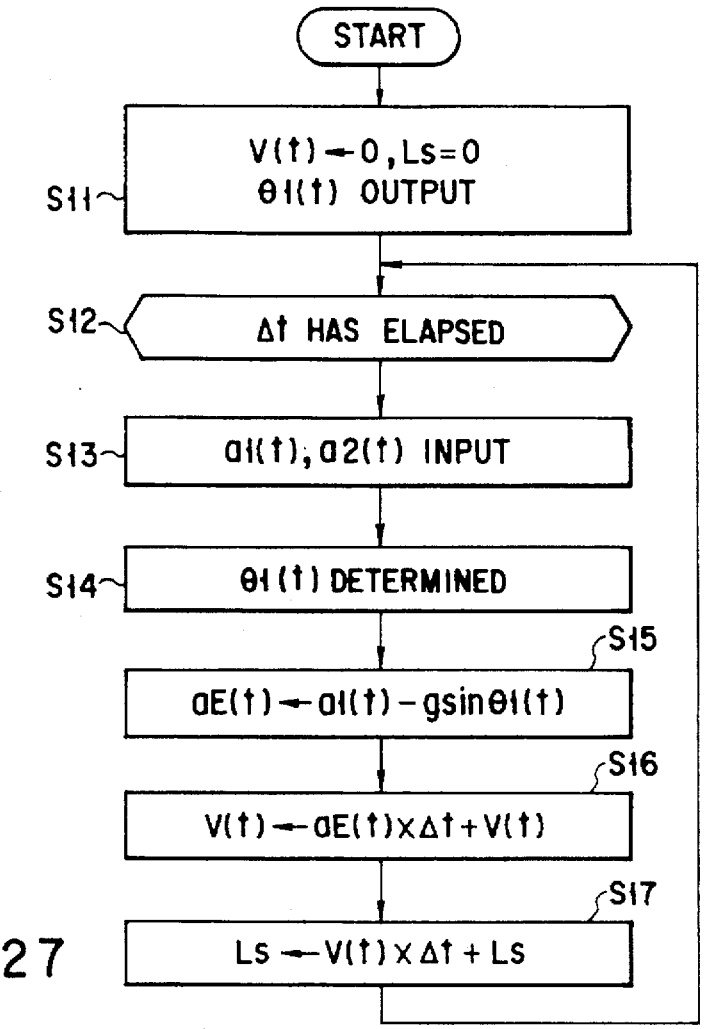
FIG. 27 is a flowchart to help explain the operation of the tilt-angle computing device.

FIG. 27 is a flowchart for the process of determining the tilt angle $\theta_1$ of the slope 313 using equation (3) from the first and second accelerations $a_1$ and $a_2$ sensed by the first and second acceleration sensors 315 and 317 as described above, computing acceleration $a_E$ of the vehicle 311 on the basis of the tilt angle $\theta_1$ using equation (4), and determining the speed v and moving distance $L_S$ of the vehicle 311 on the basis of the acceleration.

Hereinafter, the process of determining the speed v and moving distance $L_S$ of the vehicle 311 will be described with reference to the flowchart.

As shown in FIG. 27, after an infinitesimal time has elapsed since the speed v (t) and moving distance $L_S$ was initialized to 0, the A/D converters 304a, 304b convert the first and second accelerations $a_1$ (t), $a_2$ (t) sensed by the first and second acceleration sensors 303a (315), 303b (317) into digital data, which is then inputted to the CPU 1 (steps S11 to S13). Then, on the basis of the inputted acceleration and the tilt angle $\theta_2$ of the second acceleration sensor 303b (317), the tilt angle $\theta_1$ (t) of the slope 313 is determined using equation (3) (step S14). After the tilt angle $\theta_1$ (t) has been determined, the acceleration $a_E$ (t) of the vehicle 311 is computed using equation (4) (step S15).

Once the acceleration $a_E$ of the vehicle 311 has been determined, multiplying this acceleration by time gives the speed v of the vehicle 311 (step S16). Then, multiplying the speed v (t) by time gives the moving speed $L_S$ of the vehicle 311 (step S17).

The moving distance of the vehicle 311 thus determined can be applied to a navigation system instead of a method of computing the moving distance making use of car-speed pulses. With the tilt-angle computing device using an acceleration sensor of the invention, however, when the moving distance on a slope is computed, gravity correction is made in computing the tilt angle of the slope and on the basis of the tilt angle, the moving distance is determined. Therefore, by calculating the product of moving distance $L_S$ and $\cos \theta_1(t)$, $L_S \times \cos \theta_1(t)$ one by one, the moving distance can be determined accurately without errors found in a conventional equivalent, enabling the position of the vehicle on the monitor screen in the navigation system to coincide with the actual position of the vehicle.

Although the case where the tilt-angle computing device using an acceleration sensor of the invention is applied to a vehicle has been explained, the invention is not limited to this, but may be applied to a robot arm whose attitude angle needs to be known, attitude control of a vehicle, and a plane navigation system. The first acceleration sensor 303a may differ from the second acceleration sensor 303b. These two sensors may be provided separately or combined into an entity.

As described above, on the basis of the first acceleration sensed by the first acceleration sensor mounted in parallel with the direction in which a moving body advances and the second acceleration sensed by the second acceleration sensor mounted at a specific angle to the direction in which the moving body advances, the tilt angle is computed accurately without using a tilt-angle sensor, when the moving body advances on a slope. Even when the vehicle is at a standstill, the tilt angle can be sensed. Since no car-speed pulses are required, the device of the invention is easy to install in applying it to a navigation system and eliminates the difference between the position of the moving body on the screen and the actual position. Even in the case of cars on which a conventional equivalent could not be mounted because of disagreement over the specification for car-speed pulses or of absence of car-speed pulses, the device of the invention can be mounted easily.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A servo acceleration sensor comprising:
    a pendulum assembly composed of a pendulum made up of a torque coil provided on one side of a metal plate, a free end section from which said pendulum is suspended, a base end section, and a pair of plate springs connecting said free end section and said base end section;
    permanent magnets placed away from said metal plate;
    a pendulum assembly support frame that supports said pendulum assembly with said base end section being secured;
    a displacement sensor that senses the displacement of said pendulum and outputs a displacement signal in the form of an electric signal; and
    a sensing circuit that supplies power to said torque coil on the basis of said electric signal and thereby generates magnetic force to return said pendulum to the original position of said pendulum which is the position before the pendulum moves with acceleration and also senses acceleration, wherein
    said free end section and said base end section are made of synthetic resin and said free end section, said base end section, and said plate springs, and said metal plate are integrated into an entity by injection molding.

2. A servo acceleration sensor according to claim 1, wherein said base end section is secured to said pendulum assembly support frame in parallel to the pendulum sliding direction with a single bolt at the middle portion of the base end section.

3. A servo acceleration sensor according to claim 1, wherein at said pendulum assembly support frame, at least a pair of squared U-shaped rest sections opening upward and supporting said base end section from below is formed.

4. A servo acceleration sensor according to claim 2, wherein at said pendulum assembly support frame, at least a pair of squared U-shaped rest sections opening upward and supporting said base end section from below is formed.

5. A servo acceleration sensor according to claim 1, further comprising a yoke magnetically coupled with two pairs of permanent magnets and integrated with said pendulum assembly support frame, said two pairs of permanent magnets arranged such that said metal plate is located between the N pole and the S pole of the magnets of one pair and the S pole and N pole of the magnets of the other pair.

6. A servo acceleration sensor according to claim 2, further comprising a yoke magnetically coupled with two pairs of permanent magnets and integrated with said pendulum assembly support frame, said two pairs of permanent magnets arranged such that said metal plate is located between the N pole and the S pole of the magnets of one pair and the S pole and N pole of the magnets of the other pair.

7. A servo acceleration sensor according to claim 3, further comprising a yoke magnetically coupled with two pairs of permanent magnets and integrated with said pendulum assembly support frame, said two pairs of permanent magnets arranged such that said metal plate is located between the N pole and the S pole of the magnets of one pair and the S pole and N pole of the magnets of the other pair.

8. A servo acceleration sensor according to claim 4, further comprising a yoke magnetically coupled with two pairs of permanent magnets and integrated with said pendulum assembly support frame, said two pairs of permanent magnets arranged such that said metal plate is located between the N pole and the S pole of the magnets of one pair and the S pole and N pole of the magnets of the other pair.

9. A servo acceleration sensor according to claim 5, wherein said metal plate has a slit and said displacement sensor is an optical sensor that projects a beam of light from a light source fitted in a hole made in said yoke onto said slit and on the basis of the position of the light beam applied to the optical sensor after passing through said slit.

10. A servo acceleration sensor according to claim 6, wherein said metal plate has a slit and said displacement sensor is an optical sensor that projects a beam of light from a light source fitted in a hole made in said yoke onto said slit and on the basis of the position of the light beam applied to the optical sensor after passing through said slit.

11. A servo acceleration sensor according to claim 7, wherein said metal plate has a slit and said displacement sensor is an optical sensor that projects a beam of light from a light source fitted in a hole made in said yoke onto said slit and on the basis of the position of the light beam applied to the optical sensor after passing through said slit.

12. A servo acceleration sensor according to claim 8, wherein said metal plate has a slit and said displacement sensor is an optical sensor that projects a beam of light from a light source fitted in a hole made in said yoke onto said slit and on the basis of the position of the light beam applied to the optical sensor after passing through said slit.

13. A servo acceleration sensor according to claim 9, wherein an optical sensor board on which said optical sensor is mounted is attached to said yoke with screws through penetrations, said penetrations having the major axis in the direction in which said pendulum swings.

14. A servo acceleration sensor according to claim 10, wherein an optical sensor board on which said optical sensor is mounted is attached to said yoke with screws through penetrations, said penetrations having the major axis in the direction in which said pendulum swings.

15. A servo acceleration sensor according to claim 11, wherein an optical sensor board on which said optical sensor is mounted is attached to said yoke with screws through penetrations, said penetrations having the major axis in the direction in which said pendulum swings.

16. A servo acceleration sensor according to claim 12, wherein an optical sensor board on which said optical sensor is mounted is attached to said yoke with screws through penetrations, said penetrations having the major axis in the direction in which said pendulum swings.

17. A servo acceleration sensor according to claim 5, further comprising two bases having the same shape, integrated with said yoke and said pendulum assembly support frame, and supporting said yoke.

18. A servo acceleration sensor according to claim 6, further comprising two bases having the same shape, integrated with said yoke and said pendulum assembly support frame, and supporting said yoke.

19. A servo acceleration sensor according to claim 7, further comprising two bases having the same shape, integrated with said yoke and said pendulum assembly support frame, and supporting said yoke.

20. A servo acceleration sensor according to claim 8, further comprising two bases having the same shape, integrated with said yoke and said pendulum assembly support frame, and supporting said yoke.

21. A servo acceleration sensor according to claim 13, wherein a plurality of light-source fitting holes are made in a light-source board on which said light source is mounted and said optical sensor board, on one side of which wiring patterns that transmit an electric signal from the mounted optical sensor to the other side via said light-source fitting holes are formed, and wherein said light-source board and said optical sensor board are one and the same member having a wiring pattern on one surface, and said light source is mounted on said one surface of the member when the member is used as the light-source board, and is mounted on the other surface of the member when the member is used as the optical sensor board.

22. A servo acceleration sensor according to claim 14, wherein a plurality of light-source fitting holes are made in a light-source board on which said light source is mounted and said optical sensor board, on one side of which wiring patterns that transmit an electric signal from the mounted optical sensor to the other side via said light-source fitting holes are formed, and wherein said light-source board and said optical sensor board are one and the same member having a wiring pattern on one surface, and said light source is mounted on said one surface of the member when the member is used as the light-source board, and is mounted on the other surface of the member when the member is used as the optical sensor board.

23. A servo acceleration sensor according to claim 15, wherein a plurality of light-source fitting holes are made in a light-source board on which said light source is mounted and said optical sensor board, on one side of which wiring patterns that transmit an electric signal from the mounted optical sensor to the other side via said light-source fitting holes are formed, and wherein said light-source board and said optical sensor board are one and the same member having a wiring pattern on one surface, and said light source is mounted on said one surface of the member when the member is used as the light-source board, and is mounted on the other surface of the member when the member is used as the optical sensor board.

24. A servo acceleration sensor according to claim 16, wherein a plurality of light-source fitting holes are made in a light-source board on which said light source is mounted and said optical sensor board, on one side of which wiring patterns that transmit an electric signal from the mounted optical sensor to the other side via said light-source fitting holes are formed, and wherein said light-source board and said optical sensor board are one and the same member having a wiring pattern on one surface, and said light source is mounted on said one surface of the member when the member is used as the light-source board, and is mounted on the other surface of the member when the member is used as the optical sensor board.

* * * * *